(12) United States Patent
Kawata

(10) Patent No.: US 12,543,673 B2
(45) Date of Patent: Feb. 10, 2026

(54) EPIPHYTIC SYSTEM AND EPIPHYTIC METHOD

(71) Applicant: TOYOTA JIDOSHA KABUSHIKI KAISHA, Toyota (JP)

(72) Inventor: Yuto Kawata, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/951,024

(22) Filed: Nov. 18, 2024

(65) Prior Publication Data

US 2025/0212742 A1 Jul. 3, 2025

(30) Foreign Application Priority Data

Dec. 27, 2023 (JP) ................................. 2023-220203

(51) Int. Cl.
*A01G 33/00* (2006.01)
*A01G 7/04* (2006.01)

(52) U.S. Cl.
CPC ............. *A01G 33/00* (2013.01); *A01G 7/045* (2013.01)

(58) Field of Classification Search
CPC ....... A01G 33/00; A01G 7/045; C12M 1/002; C12M 1/3453; C12M 21/02; C12M 31/00; C12M 31/02; C12M 41/36; C12M 41/48; G01N 15/1475; G06T 7/521; G06T 2207/30024; G06V 20/69; G06V 20/693; G06V 20/695; G06V 20/698
See application file for complete search history.

(56) References Cited

U.S. PATENT DOCUMENTS

| | | | |
|---|---|---|---|
| 8,785,175 B2* | 7/2014 | Jones | C12N 11/082 435/257.1 |
| 9,388,372 B2* | 7/2016 | Wilson | A01K 63/06 |
| 11,638,406 B2* | 5/2023 | Goldman | A23K 50/10 47/60 |
| 11,877,549 B2* | 1/2024 | Knoll | A01C 1/044 |
| 2008/0194015 A1* | 8/2008 | Chen | C12N 1/12 435/292.1 |
| 2012/0047797 A1* | 3/2012 | Berman | A01G 33/00 47/1.4 |
| 2017/0127656 A1* | 5/2017 | Bee | C12M 1/002 |

FOREIGN PATENT DOCUMENTS

JP 2007-244351 A 9/2007

* cited by examiner

*Primary Examiner* — Magdalena Topolski
*Assistant Examiner* — Katherine Anne Kloecker
(74) *Attorney, Agent, or Firm* — Oliff PLC

(57) ABSTRACT

An epiphytic apparatus includes a bottomed water tank, a deposition-bed tool on which zoospores released from a mother alga can be deposited, and a vertical light source capable of emitting light toward the zoospores from below. The epiphytic apparatus further includes a plurality of brightness detectors disposed above the bottomed water tank and capable of detecting a brightness distribution of the vertical light source, a distribution calculation unit that calculates a 3D distribution of zoospores based on brightness detection results of the plurality of brightness detectors, and a swimming control unit that controls, based on the 3D distribution of the zoospores, the swimming of the zoospores so that the zoospores swim toward the deposition-bed tool.

8 Claims, 7 Drawing Sheets

EPIPHYTIC SYSTEM AND EPIPHYTIC METHOD

CROSS REFERENCE TO RELATED APPLICATIONS

This application is based upon and claims the benefit of priority from Japanese patent application No. 2023-220203, filed on Dec. 27, 2023, the disclosure of which is incorporated herein in its entirety by reference.

BACKGROUND

The present disclosure relates to an epiphytic system and an epiphytic method.

Patent Literature 1 discloses that a body part of a growing member, on the surface of which spores of an alga are deposited to grow the alga, is formed of an inorganic filler, so that the body part of the growing member can be easily manufactured by injection molding.

Patent Literature 1: Japanese Unexamined Patent Application Publication No. 2007-244351

SUMMARY

However, there is still a room for improving the efficiency with which zoospores are deposited on a deposition-bed tool in a water tank on land.

An epiphytic system includes: a bottomed water tank; a deposition-bed tool on which zoospores released from a mother alga can be deposited; and a first light source capable of emitting light toward the zoospores from below. According to the above-described configuration, it is possible to prevent, by the negative phototaxis of the zoospores, the zoospores from settling down and being deposited on the bottom of the bottomed water tank, and thereby to efficiently depositing the zoospores on the deposition-bed tool.

The epiphytic system may further include: a plurality of brightness detectors arranged above the bottomed water tank and capable of detecting a brightness distribution of the first light source; distribution calculation means for calculating a 3D (three-dimensional) distribution of the zoospores based on brightness detection results of the plurality of brightness detectors; at least one second light source disposed on an outer periphery of the bottomed water tank; and swimming control means for controlling, based on the 3D distribution of the zoospores, swimming of the zoospores by using the at least one second light source so that the zoospores swim toward the deposition-bed tool. According to the above-described configuration, since the zoospores swim toward the deposition-bed tool, the zoospores can be efficiently deposited on the deposition-bed tool.

The swimming control means may calculate, based on the 3D distribution of the zoospores, high-density coordinates at which the zoospores are most densely present, and control the swimming of the zoospores densely present at the high-density coordinates so that the zoospores swim toward the deposition-bed tool. According to the above-described configuration, it is possible to deposit the zoospores on the deposition-bed tool more efficiently.

The swimming control means may control, by moving the at least one second light source, the swimming of the zoospores densely present at the high-density coordinates so that the zoospores swim toward the deposition-bed tool. According to the above-described configuration, it is possible to control, by the negative phototaxis of the zoospores, the swimming of the zoospores densely present at the high-density coordinates so that the zoospores swim toward the deposition-bed tool.

The at least one second light source may include a plurality of second light sources, and the swimming control means may select a second light source to be used to emit light from among the plurality of second light sources, and thereby control the swimming of the zoospores densely present at the high-density coordinates so that the zoospores swim toward the deposition-bed tool. According to the above-described configuration, it is possible to control, by the negative phototaxis of the zoospores, the swimming of the zoospores densely present at the high-density coordinates so that the zoospores swim toward the deposition-bed tool.

The bottomed water tank may include a circular bottom plate and a cylindrical peripheral wall projecting upward from the bottom plate.

The deposition-bed tool may be disposed at a center of the bottomed water tank in a plan view.

The deposition-bed tool may be twisted yarn.

An epiphytic method includes: providing a deposition-bed tool on which zoospores released from a mother alga can be deposited in a bottomed water tank; pouring cultivating water into the bottomed water tank; disposing the mother alga in the bottomed water tank; and emitting light toward zoospores released from the mother alga from below. According to the above-described method, it is possible to prevent, by the negative phototaxis of the zoospores, the zoospores from settling down and being deposited on the bottom of the bottomed water tank, and thereby to efficiently depositing the zoospores on the deposition-bed tool.

According to the present disclosure, it is possible to efficiently deposit zoospores on a deposition-bed tool in a water tank on land.

The above and other objects, features and advantages of the present disclosure will become more fully understood from the detailed description given hereinbelow and the accompanying drawings.

DESCRIPTION OF EMBODIMENTS

The present disclosure will be described hereinafter by using embodiments according to the disclosure, but the invention according to the claims is not limited to the below-shown embodiments. Further, not all the components/structures described in the embodiments are necessarily indispensable as means for solving the problem. For clarifying the description, the following description and drawings are partially omitted and simplified as appropriate. Further, the same symbols are assigned to the same or corresponding components throughout the drawings, and redundant descriptions thereof are omitted as appropriate.

Figure 1:
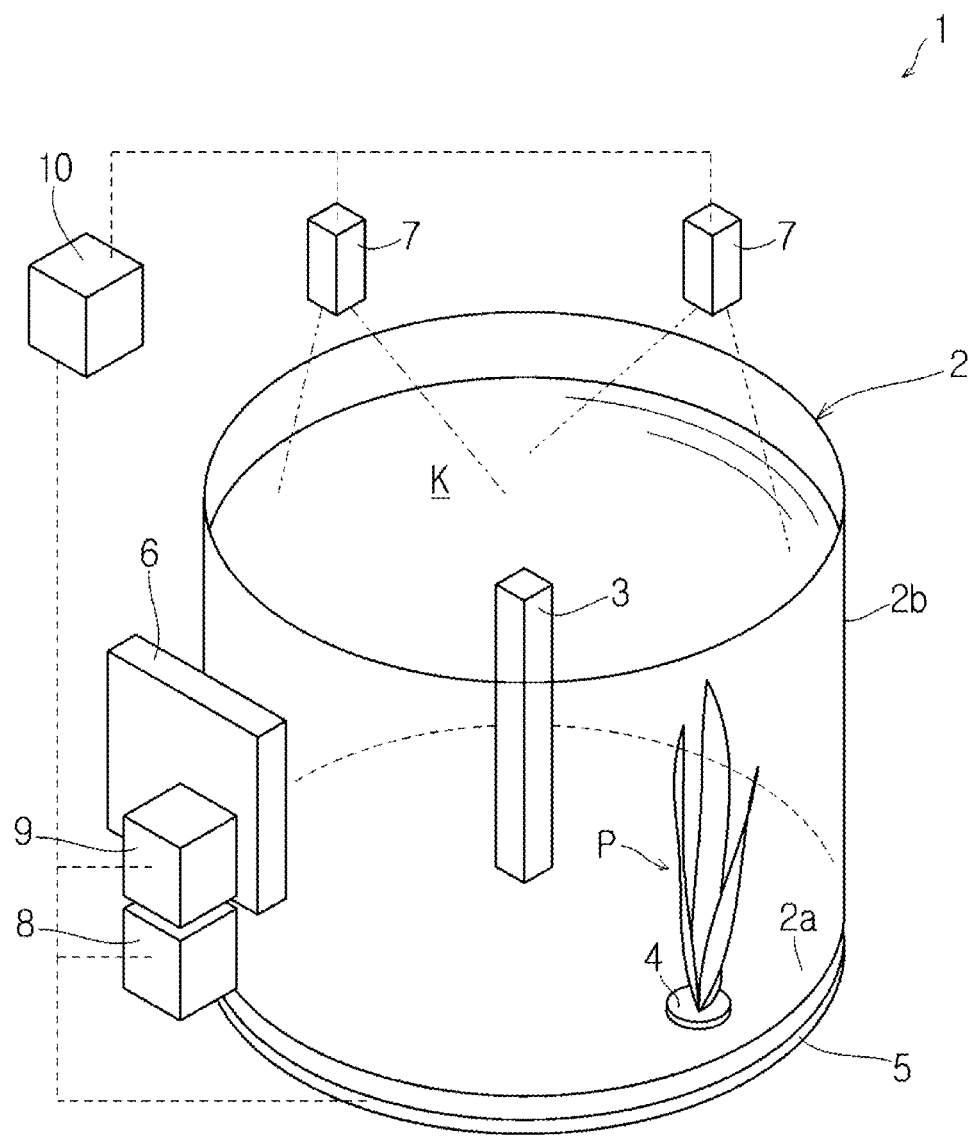
FIG. 1 is a perspective view of an epiphytic apparatus.
Figure 2:
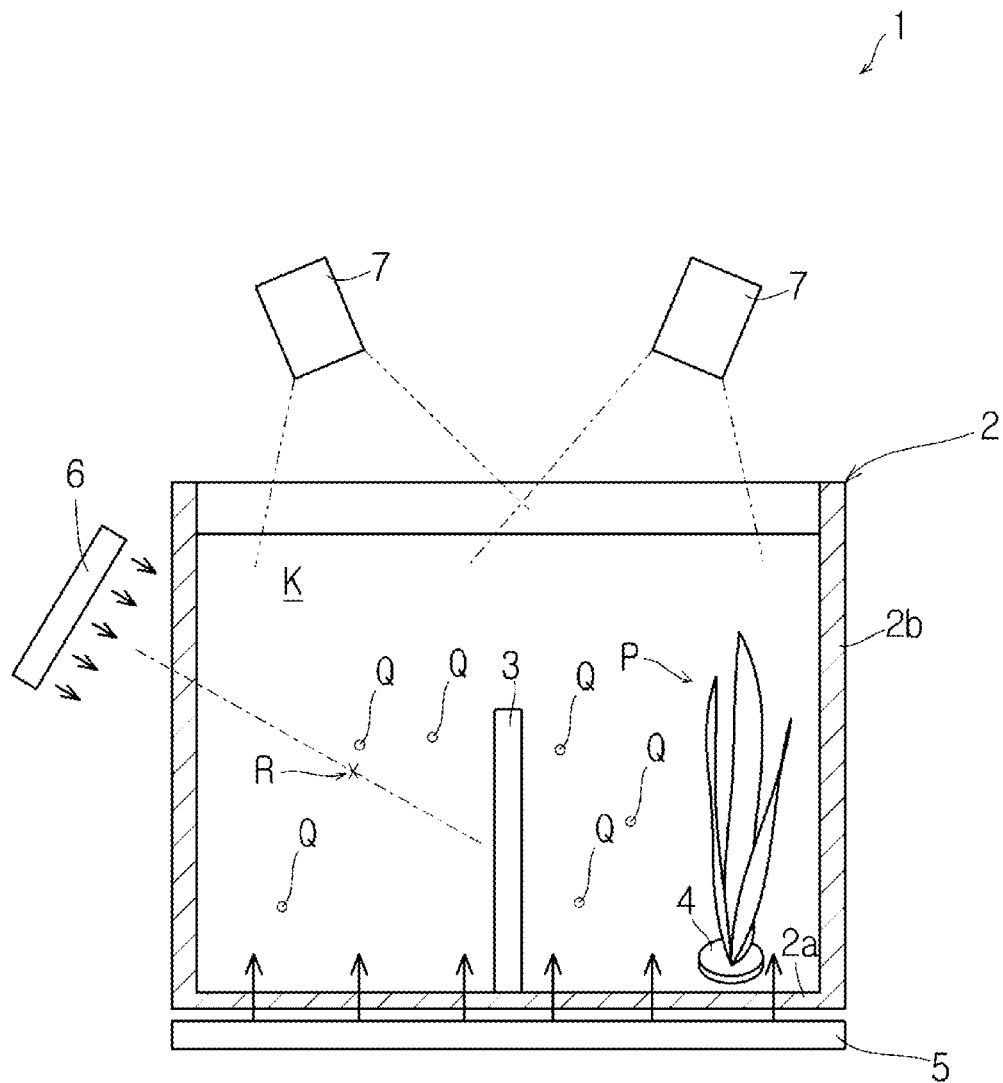
FIG. 2 is a side cross-sectional view of the epiphytic apparatus.

FIG. 1 is a perspective view of an epiphytic apparatus 1. FIG. 2 is a side cross-sectional view of the epiphytic apparatus 1. The epiphytic apparatus 1 is a specific example of the epiphytic system. The epiphytic apparatus 1 is an apparatus for depositing zoospores of seaweed on a deposition-bed tool in a water tank on land. Note that the term "epiphytic" or "deposition" means that zoospores adhere to (i.e., are deposited on) a deposition-bed tool and grow thereon. When zoospores adhere to the deposition-bed tool, they germinate and become male and female gametophytes. Therefore, in the specification of the present application, the expression that "zoospores are deposited on a deposition-bed tool" and the expression that "zoospores adhere to a deposition-bed tool" have meanings substantially the same as each other.

The seaweed is any of green algae, brown algae, and red algae. In this embodiment, the seaweed is typically brown algae such as arame seaweed (Ecklonia cava Kjellman) and kajime seaweed (Eisenia bicyclis (Kjellman) Setchell). Alternatively, the seaweed may be kelp, wakame seaweed, hijiki seaweed, or mozuku seaweed. As described above, the seaweed has such a property that it proliferates through zoospores, which are flagellated spores capable of swimming in water.

As shown in FIG. 1, the epiphytic apparatus 1 includes a bottomed water tank 2, a deposition-bed tool 3, a mother alga holding tool 4, a vertical light source 5, a horizontal light source 6, a plurality of brightness detectors 7, a moving unit 8, a swinging unit 9, and a deposition control unit 10.

The bottomed water tank 2 is a specific example of the water tank on land. The bottomed water tank 2 is formed in a circular shape in a plan view. That is, the bottomed water tank 2 includes a circular bottom plate 2a and a cylindrical peripheral wall 2b protruding upward from the outer peripheral edge of the bottom plate 2a. However, instead of the above-described structure, the bottomed water tank 2 may be formed in a rectangular shape in a plan view. The diameter of the bottomed water tank 2 is typically, but is not limited to, about 1 to 2 meters. The bottomed water tank 2 is typically made of an acrylic resin having high optical transparency. However, the bottomed water tank 2 may be made of glass, or may be partly made of an acrylic resin and partly made of glass. Seawater K is poured into the bottomed water tank 2. The seawater K is a specific example of cultivating water having a predetermined salinity.

The deposition-bed tool 3 is made of a material suitable for the deposition of zoospores thereon. The deposition-bed tool 3 is typically formed by winding twisted yarn made of cotton or Cremona (Registered Trademark) around a frame a plurality of times. Alternatively, the deposition-bed tool 3 may be made of mortar or ceramic. The deposition-bed tool 3 is disposed at the center of the bottomed water tank 2 in a plan view. Specifically, the deposition-bed tool 3 is fixed to the bottom plate 2a of the bottomed water tank 2 at the center of the bottomed water tank 2 in a plan view. Typically, the deposition-bed tool 3 is disposed so as to extend upward from the bottom plate 2a of the bottomed water tank 2. The deposition-bed tool 3 is also called a deposition substrate.

The mother alga holding tool 4 has a sufficient weight to prevent a mother alga (e.g., seeding alga) P from floating while holding the mother alga P thereon. The mother alga holding tool 4 is disposed near the peripheral wall 2b of the bottomed water tank 2 in a plan view. Specifically, the mother alga holding tool 4 is disposed on the bottom plate 2a of the bottomed water tank 2 near the peripheral wall 2b of the bottomed water tank 2 in a plan view. Note that the mother alga holding tool 4 may be fixed to the bottom plate 2a of the bottomed water tank 2.

The vertical light source 5 is a specific example of the first light source. The vertical light source 5 emits visible light toward zoospores Q released from the mother alga P from below. To do so, the vertical light source 5 is disposed below the bottom plate 2a of the bottomed water tank 2. The vertical light source 5 is disposed so as to be opposed to the bottom plate 2a of the bottomed water tank 2 in the vertical direction. The vertical light source 5 is typically formed in a circular shape in a plan view. In this embodiment, the vertical light source 5 is composed of a surface-emitting LED panel for plant cultivation. The vertical light source 5 may be composed of a plurality of surface-emitting LED panels arranged in an orderly manner, or may be composed of one surface-emitting LED panel. The vertical light source 5 typically emits visible light having a wavelength of 660 nanometers, which is considered to be a wavelength suitable for plant growth, toward the bottom plate 2a of the bottomed water tank 2 from below. In this way, it is possible to prevent, by the negative phototaxis of the zoospores Q, the zoospores Q from settling down and being deposited on the bottom plate 2a of the bottomed water tank 2. An example of the surface-emitting LED panel is M-04319 manufactured by Akizuki Denshi Tsusho Co., Ltd. Note that instead of disposing the vertical light source 5 below the bottom plate 2a of the bottomed water tank 2, the vertical light source 5 may be disposed on the upper surface of the bottom plate 2a of the bottomed water tank 2 in the bottomed water tank 2.

The horizontal light source 6 is a specific example of the second light source. The horizontal light source 6 is disposed on the outer periphery of the bottomed water tank 2 and emits visible light toward the zoospores Q. The horizontal light source 6 is disposed on the outer periphery of the bottomed water tank 2 and emits visible light toward the deposition-bed tool 3. Specifically, the horizontal light source 6 is disposed on the outer side of the peripheral wall 2b of the bottomed water tank 2 in the radial direction of the bottomed water tank 2. The horizontal light source 6 is disposed so as to be opposed to the peripheral wall 2b of the bottomed water tank 2 in the radial direction of the bottomed water tank 2. The horizontal light source 6 can be moved along the peripheral wall 2b of the bottomed water tank 2 by the moving unit 8. That is, the horizontal light source 6 is movable in an arc shape along the peripheral wall 2b of the bottomed water tank 2 in a plan view, and is also movable in the vertical direction in a side view. The moving unit 8 is typically composed of a guide rail(s), a body part movable along the guide rail(s), and a driving source such as a motor.

The orientation of the horizontal light source 6 can be adjusted by the swinging unit 9. That is, the elevation angle of the direction in which the horizontal light source 6 emits visible light can be adjusted by the swinging unit 9. The swinging unit 9 is typically composed of a body part that holds the horizontal light source 6 in such a manner that the horizontal light source 6 is rotatable about the pitch axis, and a driving source such as a motor. The horizontal light source 6 is typically a light-guiding plate-type surface light source. An example of the light-guiding plate-type surface light source is A4H-L1116-4S8 manufactured by Lumitechno Co., Ltd. The horizontal light source 6 is disposed so that it is not included in the angle of view of either of the two brightness detectors 7.

The plurality of brightness detectors 7 are disposed above the bottomed water tank 2 and detect (i.e., obtain) a brightness distribution of the vertical light source 5 (i.e., a distribution of brightness of light emitted from the vertical light source 5). In this embodiment, the plurality of brightness detectors 7 include two brightness detectors 7. As shown in FIGS. 1 and 2, the two brightness detectors 7 are arranged apart from each other in a plan view. Typically, the two brightness detectors 7 are arranged in a point-symmetric manner with the bottomed water tank 2 being at the center therebetween in a plan view. Each of the brightness detectors 7 is disposed on the inner side of the peripheral wall 2b of the bottomed water tank 2 in the radial direction of the bottomed water tank 2 in a plan view. Each of the brightness detectors 7 is disposed so that the vertical light source 5 is included in its angle of view. An example of the brightness detector 7 is a BM-7AC manufactured by Topcon Technohouse Corporation. Each of the brightness detectors 7 outputs a brightness detection result to the deposition control unit 10. The brightness detection result is data representing a brightness distribution of the vertical light source 5 observed (i.e., obtained) by the respective brightness detector 7. Specifically, the brightness detection result is composed of a brightness value for each unit cubic angle viewed from the respective brightness detector 7.

Figure 3:
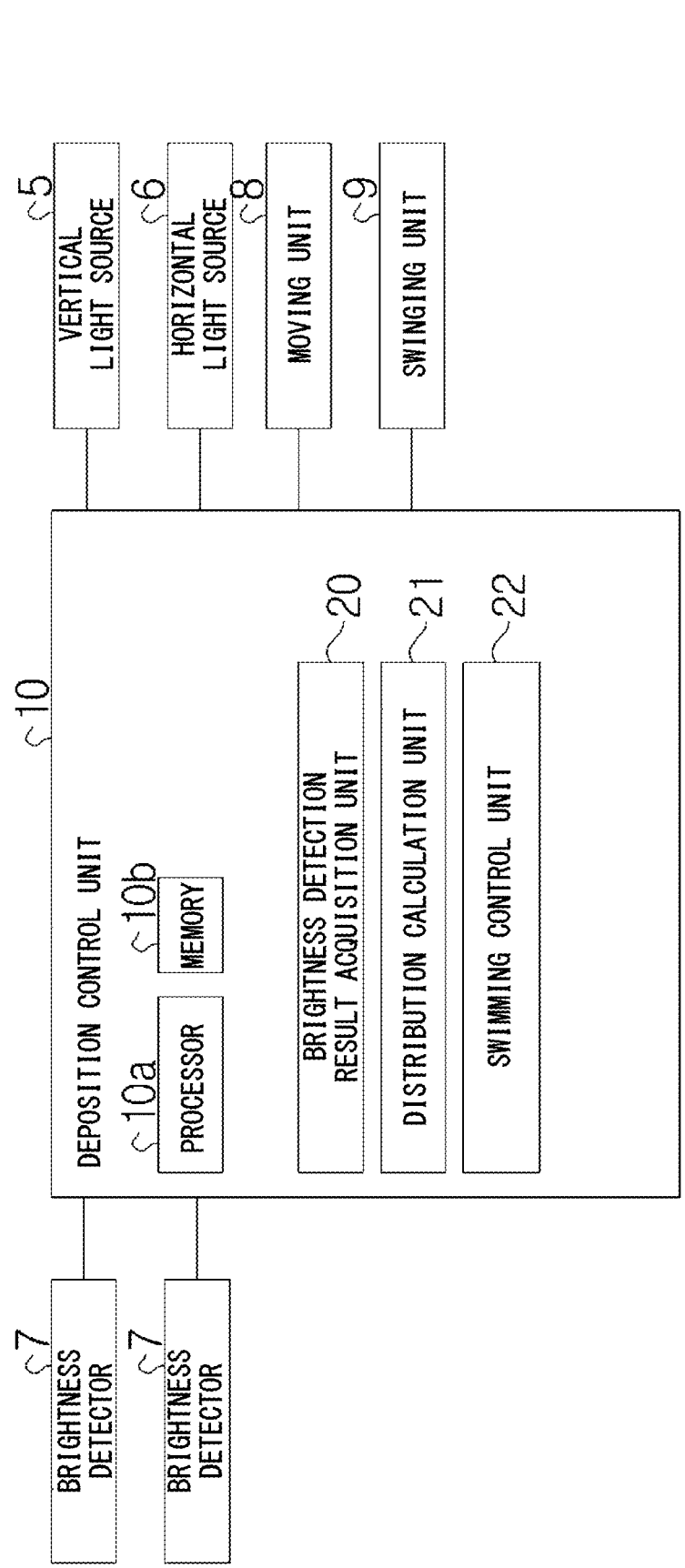
FIG. 3 is a block diagram of the epiphytic apparatus.

FIG. 3 is a block diagram of the epiphytic apparatus 1. As shown in FIG. 3, the deposition control unit 10 includes a processor 10a and a memory 10b. The processor 10a can access the memory 10b. The processor 10a loads and executes a program stored in the memory 10b. In this way, the processor 10a makes hardware such as the processor 10a and the memory 10b to function as a brightness detection result acquisition unit 20, a distribution calculation unit 21, and a swimming control unit 22.

The brightness detection result acquisition unit 20 is a specific example of the brightness detection result acquisition means. The brightness detection result acquisition unit 20 acquires brightness detection results from the two brightness detectors 7.

The distribution calculation unit 21 is a specific example of the distribution calculation means. The distribution calculation unit 21 calculates a 3D (three-dimensional) distribution of zoospores Q based on the brightness detection results of the two brightness detectors 7. Specifically, the distribution calculation unit 21 geometrically calculates a 3D distribution of zoospores Q in the bottomed water tank 2 based on position coordinates at which the two brightness detectors 7 are disposed, the postures (e.g., orientations) of the two disposed brightness detectors 7, and the brightness detection results thereof. The distribution calculation unit 21 calculates the 3D distribution of zoospores Q as described above by using such a characteristic that light emitted from the vertical light source 5 is blocked by zoospores Q. For example, coordinates at which a first straight line connecting one of the brightness detectors 7 and the lowest brightness part of the brightness distribution of the vertical light source 5 observed from this brightness detector 7 and a second straight line connecting the other brightness detector 7 and the lowest brightness part of the brightness distribution of the vertical light source 5 observed from this brightness detector 7 intersect each other indicate coordinates at which zoospores Q are most densely present. The 3D distribution of zoospores Q may indicate a 3D distribution in the entire space inside the bottomed water tank 2, or may indicate only the coordinates at which zoospores Q are most densely present in the bottomed water tank 2.

The swimming control unit 22 is a specific example of the swimming control means. The swimming control unit 22 controls, based on the 3D distribution of zoospores Q calculated by the distribution calculation unit 21, the swimming of the zoospores Q so that the zoospores Q swim toward the deposition-bed tool 3. Specifically, the swimming control unit 22 controls the swimming of the zoospores Q as follows.

Firstly, as shown in FIG. 2, the swimming control unit 22 calculates high-density coordinates R at which zoospores Q are most densely present based on the 3D distribution of zoospores Q. The high-density coordinates R can be considered to correspond to the minimum value in the brightness distribution. Next, the swimming control unit 22 controls, by moving the horizontal light source 6, the swimming of the zoospores Q densely present at the high-density coordinates R so that zoospores Q swim toward the deposition-bed tool 3.

Note that by the negative phototaxis of the zoospores Q, the zoospores Q swim so as to move away from the horizontal light source 6. Therefore, the swimming control unit 22 moves the horizontal light source 6 by controlling the moving unit 8 so that the horizontal light source 6 is positioned opposite to the deposition-bed tool 3 across the high-density coordinates R, and hence the horizontal light source 6, the high-density coordinates R, and the deposition-bed tool 3 are aligned in a straight line. Note that the arrangement in which the horizontal light source 6, the high-density coordinates R, and the deposition-bed tool 3 are aligned in a straight line typically means an arrangement in which the coordinates of the center of the horizontal light source 6, the high-density coordinates R, and the coordinates of the center of the deposition-bed tool 3 are aligned in a straight line. Further, the swimming control unit 22 adjusts the posture (e.g., orientation) of the horizontal light source 6 by controlling the swinging unit 9 so that the horizontal light source 6 emits light toward the zoospores Q densely present at the high-density coordinates R. As a result, a larger number pf zoospores Q swim toward the deposition-bed tool 3, thus making it possible to efficiently deposit zoospores Q on the deposition-bed tool 3.

Figure 4:
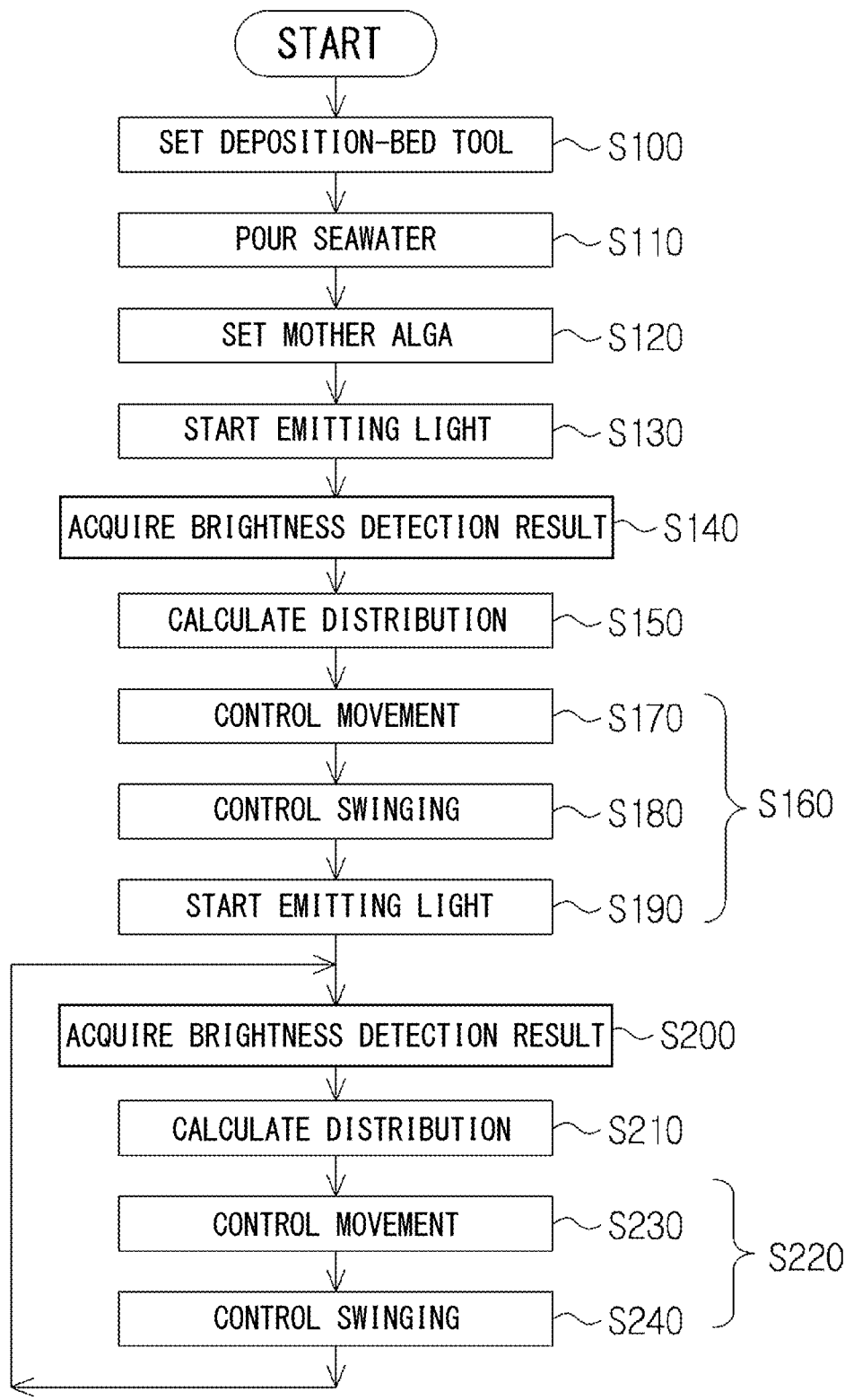
FIG. 4 is a flowchart of an epiphytic method.

Next, an epiphytic method using the epiphytic apparatus 1 will be described with reference to FIG. 4.

S100

Firstly, the deposition-bed tool 3 is disposed in the bottomed water tank 2.

S110

Next, seawater K is poured into the bottomed water tank 2.

S120

Next, after the mother alga holding tool 4 is attached to a mother alga (e.g., seeding alga) P, the mother alga P is put into the bottomed water tank 2 and disposed therein. As a result, zoospores are released from the mother alga P.

S130

Next, the deposition control unit 10 turns on the vertical light source 5. As a result, the vertical light source 5 emits visible light toward the zoospores Q released from the mother alga P from below.

S140

Next, the brightness detection result acquisition unit 20 of the deposition control unit 10 acquires brightness detection results from the two brightness detectors 7.

S150

Next, the distribution calculation unit 21 of the deposition control unit 10 calculates a 3D distribution of zoospores Q based on the brightness detection results of the two brightness detectors 7.

S160

Next, the swimming control unit 22 of the deposition control unit 10 controls, based on the 3D distribution of zoospores Q calculated by the distribution calculation unit

21, the swimming of the zoospores Q so that the zoospores Q swim toward the deposition-bed tool 3. Specifically, the swimming control unit 22 of the deposition control unit 10 moves the horizontal light source 6 by controlling the moving unit 8 so that the horizontal light source 6, the high-density coordinates R, and the deposition-bed tool 3 are aligned in a straight line (S170). Further, the swimming control unit 22 of the brightness detection result acquisition unit 20 adjusts the posture (e.g., orientation) of the horizontal light source 6 by controlling the swinging unit 9 so that the horizontal light source 6 emits light toward the zoospores Q densely present at the high-density coordinates R (S180). Then, the swimming control unit 22 of the deposition control unit 10 turns on the horizontal light source 6 (S190). As a result, the horizontal light source 6 emits visible light toward the zoospores Q released from the mother alga P from the side thereof. In response to this emitted visible light, the zoospores Q released from the mother alga P start swimming toward the deposition-bed tool 3.

S200

Next, the brightness detection result acquisition unit 20 of the deposition control unit 10 acquires brightness detection results from the two brightness detectors 7.

S210

Next, the distribution calculation unit 21 of the deposition control unit calculates a 3D distribution of zoospores Q based on the brightness detection results of the two brightness detectors 7.

S220

Next, the swimming control unit 22 of the deposition control unit 10 controls, based on the 3D distribution of zoospores Q calculated by the distribution calculation unit 21, the swimming of the zoospores Q so that the zoospores Q swim toward the deposition-bed tool 3. Specifically, the swimming control unit 22 of the deposition control unit 10 moves the horizontal light source 6 by controlling the moving unit 8 so that the horizontal light source 6, the high-density coordinates R, and the deposition-bed tool 3 are aligned in a straight line (S230). Further, the swimming control unit 22 of the brightness detection result acquisition unit 20 adjusts the posture of the horizontal light source 6 by controlling the swinging unit 9 so that the horizontal light source 6 emits light toward zoospores Q densely present at the high-density coordinates R (S240). Then, the deposition control unit 10 returns the process to the step S200.

The first embodiment according to the present disclosure has been described above. The above-described first embodiment has the following features.

The epiphytic apparatus 1 (epiphytic system) includes the bottomed water tank 2, the deposition-bed tool 3 on which zoospores Q released from a mother alga P can be deposited, and the vertical light source 5 (first light source) capable of emitting light toward the zoospores Q from below. According to the above-described configuration, it is possible to prevent, by the negative phototaxis of the zoospores Q, the zoospores Q from settling down and being deposited on the bottom of the bottomed water tank 2, and thereby to efficiently deposit the zoospores Q on the deposition-bed tool 3.

Further, the epiphytic apparatus 1 also includes the plurality of brightness detectors 7 arranged above the bottomed water tank 2 and capable of detecting a brightness distribution of the vertical light source 5, the distribution calculation unit 21 (distribution calculation means) that calculates a 3D distribution of the zoospores Q based on brightness detection results of the plurality of brightness detectors 7, the horizontal light source 6 (at least one second light source) disposed on the outer periphery of the bottomed water tank 2, and the swimming control unit 22 (swimming control means) that controls, based on the 3D distribution of the zoospores Q and by using the horizontal light source 6, the swimming of the zoospores Q so that the zoospores Q swim toward the deposition-bed tool 3. According to the above-described configuration, since the zoospores Q swim toward the deposition-bed tool 3, the zoospores Q can be efficiently deposited on the deposition-bed tool 3.

Firstly, the swimming control unit 22 calculates high-density coordinates R at which zoospores Q are most densely present based on the 3D distribution of zoospores Q. The swimming control unit 22 controls the swimming of the zoospores Q densely present at the high-density coordinates R so that the zoospores Q swim toward the deposition-bed tool 3. According to the above-described configuration, it is possible to deposit the zoospores Q on the deposition-bed tool 3 more efficiently.

The swimming control unit 22 controls, by moving the horizontal light source 6, the swimming of the zoospores Q so that the zoospores Q densely present at the high-density coordinates R swim toward the deposition-bed tool 3. According to the above-described configuration, it is possible to control, by the negative phototaxis of the zoospores Q, the swimming of the zoospores Q so that the zoospores Q densely present at the high-density coordinates R swim toward the deposition-bed tool 3.

The bottomed water tank 2 includes the circular bottom plate 2*a* and the cylindrical peripheral wall 2*b* projecting upward from the bottom plate 2*a*.

The deposition-bed tool 3 is disposed at the center of the bottomed water tank 2 in a plan view.

The deposition-bed tool 3 is typically twisted yarn.

The deposition of zoospores Q is performed by the below-shown method. A deposition-bed tool 3 on which zoospores Q released from a mother alga P can be deposited is provided in a bottomed water tank 2 (S100). Seawater K is poured into the bottomed water tank 2 as cultivating water (S110). A mother alga P is disposed in the bottomed water tank 2 (S120). Light is emitted toward zoospores Q released from the mother alga P from below (S130). According to the above-described method, it is possible to prevent, by the negative phototaxis of the zoospores Q, the zoospores Q from settling down and being deposited on the bottom of the bottomed water tank 2, and thereby to efficiently deposit the zoospores Q on the deposition-bed tool 3.

Second Embodiment

Next, a second embodiment according to the present disclosure will be described. This embodiment will be described hereinafter with particular emphasis on the points different from those of the first embodiment, and redundant description thereof will be omitted.

As shown in FIGS. 1 and 2, the position and posture (e.g., orientation) of the horizontal light source 6 are adjusted so that zoospores Q move toward the deposition-bed tool 3 in the above-described first embodiment.

In contrast, in this embodiment, as shown in FIG. 5, the epiphytic apparatus 1 includes a plurality of horizontal light sources 6 arranged side by side on the outer periphery of the bottomed water tank 2. The plurality of horizontal light sources 6 are a specific example of the plurality of second light sources. The plurality of horizontal light sources 6 are arranged along the peripheral wall 2*b* of the bottomed water tank 2. The plurality of horizontal light sources 6 are arranged at predetermined intervals along the peripheral wall 2*b* of the bottomed water tank 2 in a plan view. The plurality of horizontal light sources 6 are arranged in the vertical direction along the peripheral wall 2$b$ of the bottomed water tank 2 in a side view shown in FIG. 5. In this embodiment, three horizontal light sources 6 are arranged side by side in the vertical direction. Among the three horizontal light sources 6, the upper horizontal light source 6 is set (i.e., oriented) so that its visible-light emitting direction is inclined slightly downward, so that this horizontal light source 6 emits visible light toward the deposition-bed tool 3. The middle horizontal light source 6 is set (i.e., oriented) so that its visible-light emitting direction is horizontal, so that this horizontal light source 6 emits visible light toward the deposition-bed tool 3. The lower horizontal light source 6 is set (i.e., oriented) so that its visible-light emitting direction is inclined slightly upward, so that this horizontal light source 6 emits visible light toward the deposition-bed tool 3.

Figure 5:
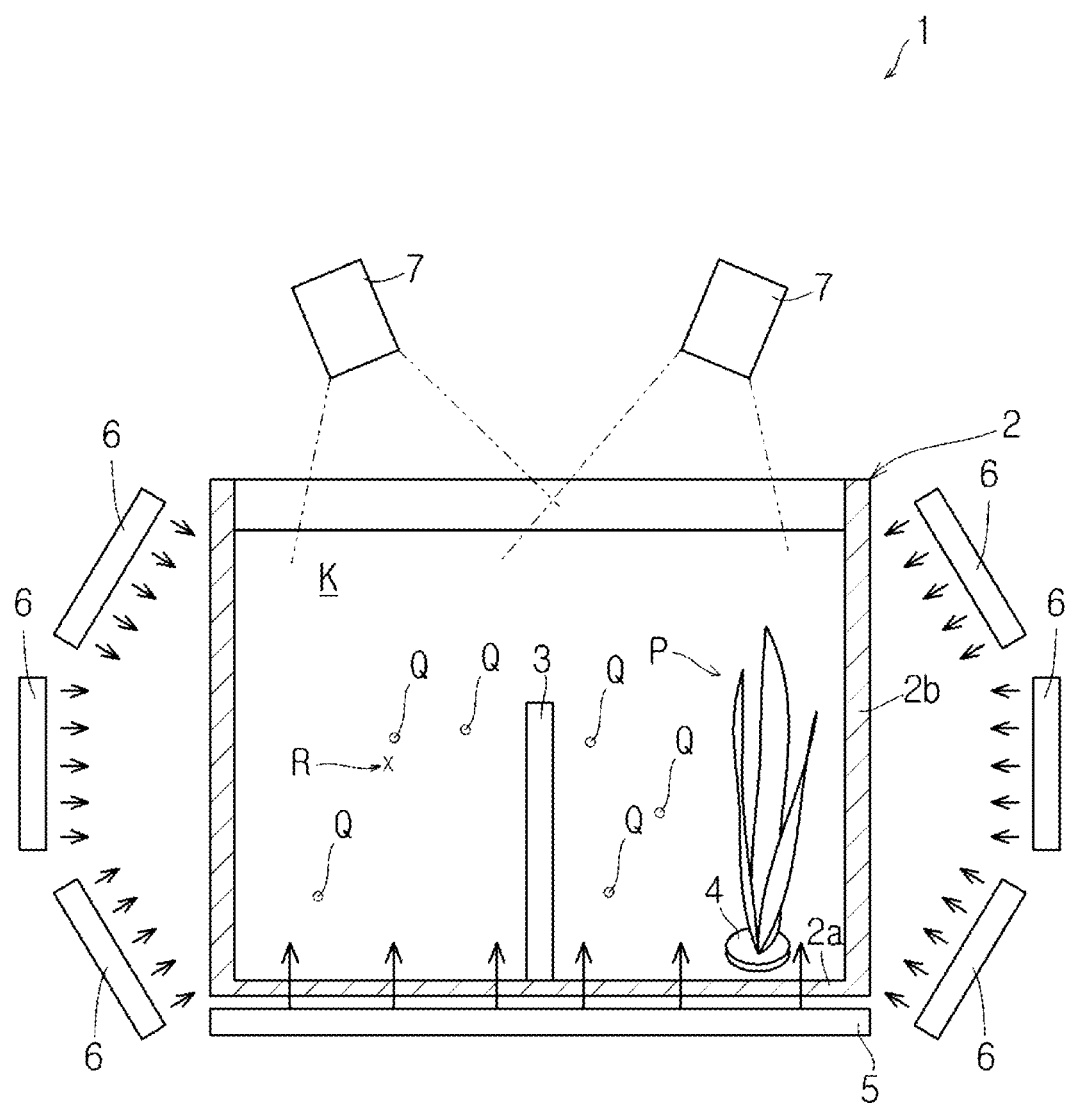
FIG. 5 is a side cross-sectional view of an epiphytic apparatus.
Figure 6:
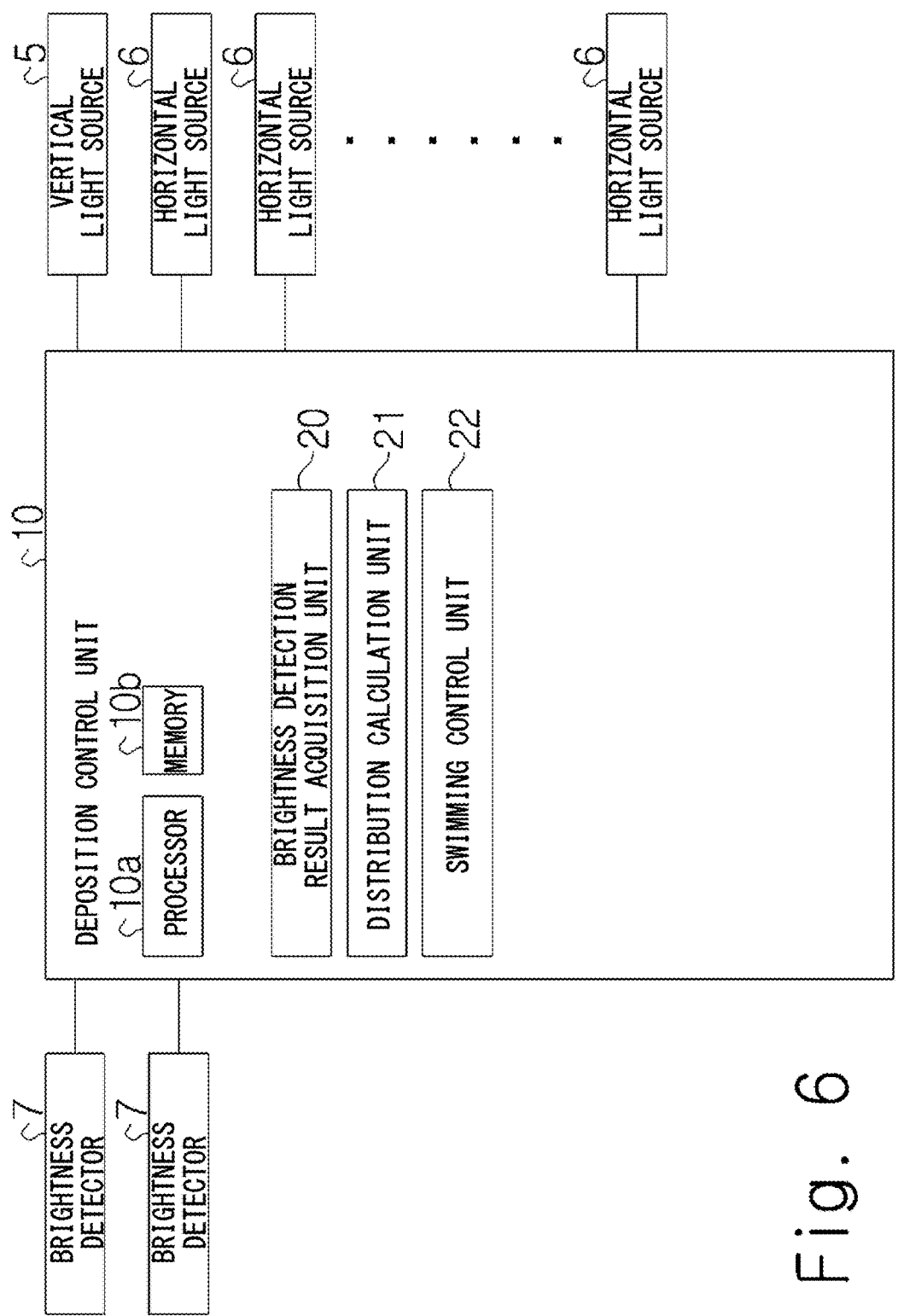
FIG. 6 is a block diagram of the epiphytic apparatus.

FIG. 6 is a block diagram of the epiphytic apparatus 1 according to this embodiment. As shown in FIGS. 5 and 6, the swimming control unit 22 controls, based on the 3D distribution of zoospores Q calculated by the distribution calculation unit 21, the swimming of the zoospores Q so that the zoospores Q swim toward the deposition-bed tool 3. In this embodiment, the moving unit 8 and the swinging unit 9 are omitted (i.e., are not provided). Specifically, the swimming control unit 22 controls the swimming of the zoospores Q as follows.

Firstly, as shown in FIG. 5, the swimming control unit 22 calculates high-density coordinates R at which zoospores Q are most densely present based on the 3D distribution of zoospores Q. Next, the swimming control unit 22 controls, by selectively turning on one of the plurality of horizontal light sources 6, the swimming of the zoospores Q densely present at the high-density coordinates R so that the zoospores Q swim toward the deposition-bed tool 3.

Note that by the negative phototaxis of the zoospores Q, the zoospores Q swim so as to move away from the horizontal light source 6. Therefore, the swimming control unit 22 selects one of the plurality of horizontal light sources 6 so that the selected horizontal light source 6 is positioned opposite to the deposition-bed tool 3 across the high-density coordinates R, and hence the horizontal light source 6, the high-density coordinates R, and the deposition-bed tool 3 are aligned in a straight line. As a result, a larger number pf zoospores Q swim toward the deposition-bed tool 3, thus making it possible to efficiently deposit zoospores Q on the deposition-bed tool 3.

Figure 7:
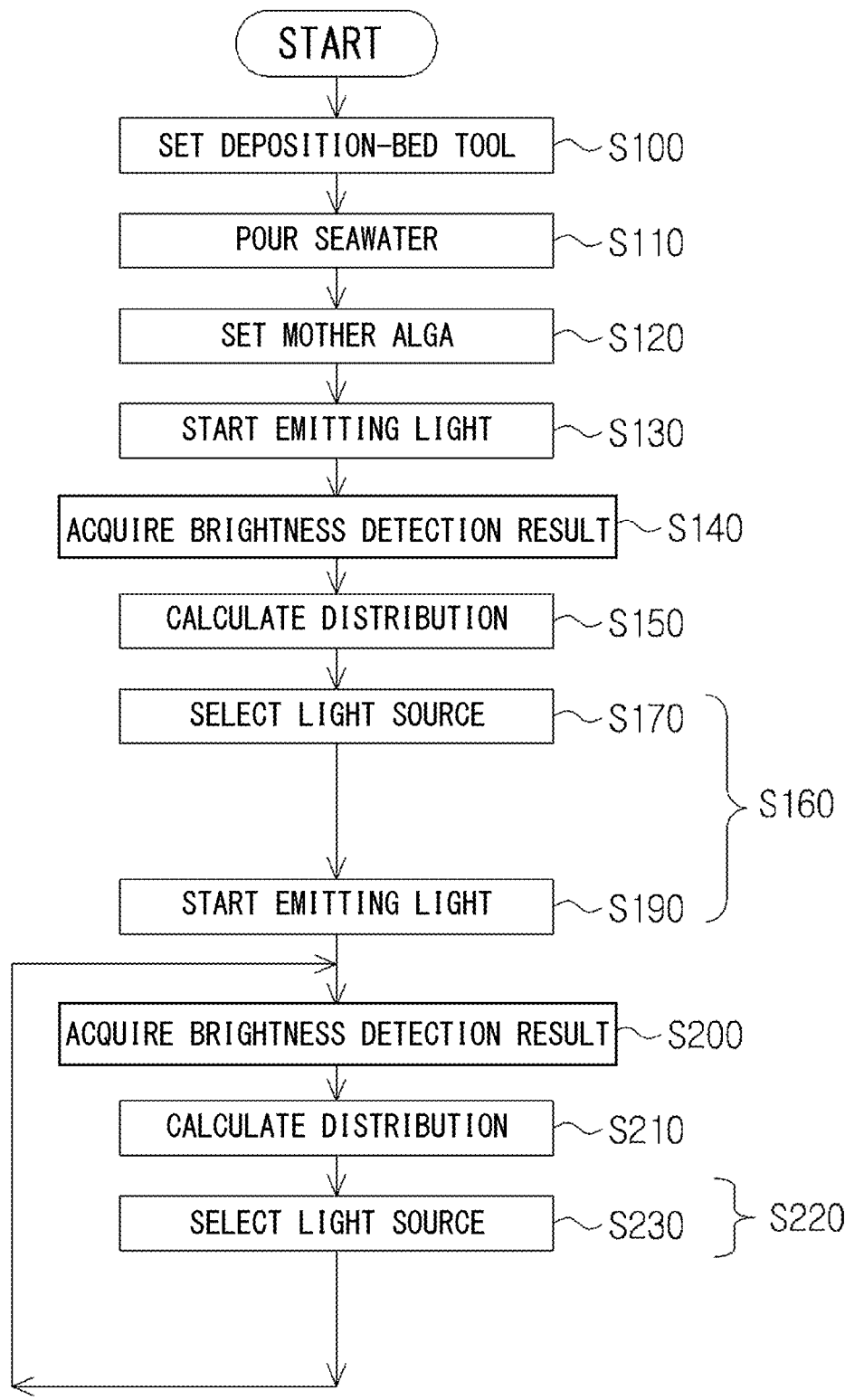
FIG. 7 is a flowchart of an epiphytic method.

Next, an epiphytic method using the epiphytic apparatus 1 will be described with reference to FIG. 7.

Steps S160 and S220 of the epiphytic method according to this embodiment differs from those in the epiphytic method according to the first embodiment.

In the step S160 in this embodiment, the swimming control unit 22 of the deposition control unit 10 controls, based on the 3D distribution of zoospores Q calculated by the distribution calculation unit 21, the swimming of the zoospores Q so that the zoospores Q swim toward the deposition-bed tool 3. Specifically, the swimming control unit 22 of the deposition control unit 10 selects one of the plurality of horizontal light sources 6 so that the selected horizontal light source 6, the high-density coordinates R, and the deposition-bed tool 3 are aligned in a straight line (S170). Next, the swimming control unit 22 of the deposition control unit 10 turns on the selected horizontal light source 6 (S190). As a result, the horizontal light source 6 emits visible light toward zoospores Q released from the mother alga P from the side thereof. In response to this emitted visible light, the zoospores Q released from the mother alga P start swimming toward the deposition-bed tool 3.

In the step S220 in this embodiment, the swimming control unit 22 of the deposition control unit 10 controls, based on the 3D distribution of zoospores Q calculated by the distribution calculation unit 21, the swimming of the zoospores Q so that the zoospores Q swim toward the deposition-bed tool 3. Specifically, the swimming control unit 22 of the deposition control unit 10 selects one of the plurality of horizontal light sources 6 so that the selected horizontal light source 6, the high-density coordinates R, and the deposition-bed tool 3 are aligned in a straight line (S230).

The second embodiment according to the present disclosure has been described above. The above-described second embodiment has the following features.

The epiphytic apparatus 1 further includes the plurality of horizontal light sources 6 (at least one second light source) arranged side by side on the outer periphery of the bottomed water tank 2. The swimming control unit 22 selects a light source 6 to be used to emit light from among the plurality of light sources 6, and thereby controls the swimming of the zoospores Q densely present at the high-density coordinates R so that the zoospores Q swim toward the deposition-bed tool 3. According to the above-described configuration, it is possible to control, by the negative phototaxis of the zoospores Q, the swimming of the zoospores Q densely present at the high-density coordinates R so that the zoospores Q swim toward the deposition-bed tool 3.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer through a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:
1. An epiphytic system comprising:
  a bottomed water tank;
  a deposition-bed tool on which zoospores released from a mother alga can be deposited;
  a first light source capable of emitting light toward the zoospores from below;
  a plurality of brightness detectors arranged above the bottomed water tank and capable of detecting a brightness distribution of the first light source;

a distribution calculator calculating a 3D (three-dimensional) distribution of the zoospores based on brightness detection results of the plurality of brightness detectors;

at least one second light source disposed on an outer periphery of the bottomed water tank; and a swimming controller controlling, based on the 3D distribution of the zoospores, swimming of the zoospores by using the at least one second light source so that the zoospores swim toward the deposition-bed tool.

2. The epiphytic system according to claim 1, wherein the swimming controller:

calculates, based on the 3D distribution of the zoospores, high-density coordinates at which the zoospores are most densely present; and controls the swimming of the zoospores densely present at the high-density coordinates so that the zoospores swim toward the deposition-bed tool.

3. The epiphytic system according to claim 2, wherein the swimming controller controls, by moving the at least one second light source, the swimming of the zoospores densely present at the high-density coordinates so that the zoospores swim toward the deposition-bed tool.

4. The epiphytic system according to claim 2, wherein:

the at least one second light source includes a plurality of second light sources, and the swimming controller selects a second light source to be used to emit light from among the plurality of second light sources, and thereby controls the swimming of the zoospores densely present at the high-density coordinates so that the zoospores swim toward the deposition-bed tool.

5. The epiphytic system according to claim 1, wherein the bottomed water tank includes a circular bottom plate and a cylindrical peripheral wall projecting upward from the bottom plate.

6. The epiphytic system according to claim 1, wherein the deposition-bed tool is disposed at a center of the bottomed water tank in a plan view.

7. The epiphytic system according to claim 1, wherein the deposition-bed tool is twisted yarn.

8. An epiphytic method comprising:

providing a deposition-bed tool on which zoospores released from a mother alga can be deposited in a bottomed water tank;

pouring cultivating water into the bottomed water tank;

disposing the mother alga in the bottomed water tank; and emitting light toward zoospores released from the mother alga from below.

* * * * *